United States Patent [19]

Mitchell et al.

[11] Patent Number: 5,026,427
[45] Date of Patent: Jun. 25, 1991

[54] PROCESS FOR MAKING PIGMENTED INK JET INKS

[75] Inventors: Robert D. Mitchell, Pittsford, N.Y.; Torence J. Trout, Yorklyn, Del.

[73] Assignee: E. I. DuPont de Nemours and Company, Wilmington, Del.

[21] Appl. No.: 256,809

[22] Filed: Oct. 12, 1988

[51] Int. Cl.$^5$ ............................................. C09D 11/02
[52] U.S. Cl. ......................................... 106/23; 106/20; 106/401; 366/136; 366/173; 366/176
[58] Field of Search ........................... 106/23, 20, 401; 366/136, 173, 176

[56] References Cited

U.S. PATENT DOCUMENTS

| 4,365,035 | 12/1982 | Zabiak | 524/283 |
|---|---|---|---|
| 4,533,254 | 8/1985 | Cook et al. | 366/176 |
| 4,597,794 | 7/1986 | Ohta et al. | 106/20 |
| 4,692,188 | 9/1987 | Ober et al. | 106/23 |
| 4,742,098 | 5/1988 | Finlayson et al. | 106/468 |
| 4,783,389 | 11/1988 | Trout et al. | 430/137 |

FOREIGN PATENT DOCUMENTS

| 0284034 | 9/1988 | European Pat. Off. . |
| 61-57669 | 3/1986 | Japan . |
| 61-168677 | 7/1986 | Japan . |
| 818489 | 8/1959 | United Kingdom . |

OTHER PUBLICATIONS

Croucher, "Surfactants in Emerging Technologies", Rosen ed., pp. 1-41, Chaps. 1 & 2 (1987).
Doane, Journal of Applied Photographic Engineering, pp. 121-125, vol. 7, No. 5, Oct. 1981.
Research Disclosure Abstract No. 20033, published in Dec. 1988, p. 540.

Primary Examiner—William R. Dixon, Jr.
Assistant Examiner—Helene Klemanski

[57] ABSTRACT

In accordance with this invention there is provided a process for the preparation of pigmented ink jet inks comprising:
(a) mixing at least one pigment and at least one pigment dispersant in a dispersant medium to form a pigmented ink mixture wherein pigment is present in an amount up to 60% by weight based on the total weight of the mixture;
(b) deflocculating the pigmented ink mixture by passing the pigmented ink mixture through at least a plurality of nozzles within a liquid jet interaction chamber at a liquid pressure of at least 1,000 psi to produce a substantially uniform dispersion of pigment particles in the dispersant medium.

10 Claims, 2 Drawing Sheets

F I G. 1
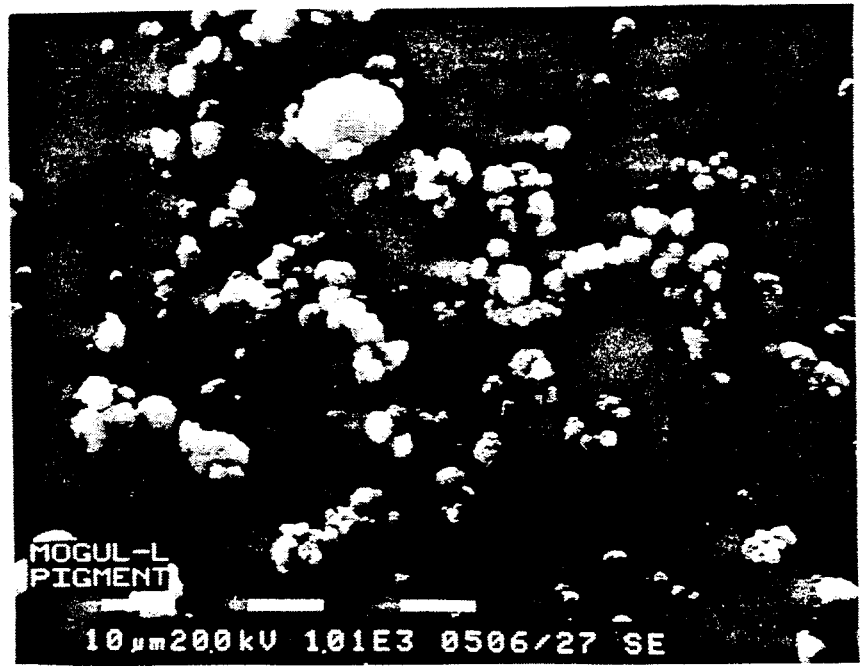

F I G. 2
F I G. 3

5,026,427

PROCESS FOR MAKING PIGMENTED INK JET INKS

FIELD OF THE INVENTION

This invention relates to an improved process for the preparation of pigmented ink jet inks. More particularly, this invention relates to a process for the rapid preparation of high resolution pigmented ink jet inks.

BACKGROUND OF THE INVENTION

Ink-jet printing is frequently categorized as a nonimpact or impactless printing technology in which a uniform train of ink droplets is generated by a Rayleigh instability. These ink droplets are then directed onto paper to produce text and graphics.

Numerous variations of ink-jet printers exist although only two modes of operation appear to have been widely studied.

The first mode of operation is known as the drop-on-demand system in which droplets of ink are generated as needed and are ejected from 20–80 micrometer orifices producing a stream of ink droplets with a velocity of ~3 m sec$^{-1}$. In the drop-on-demand system ink droplets are produced either by thermal bubble formation in which a vapor bubble is formed which forces an ink droplet through the orifice or by a piezoelectric crystal vibrating at high frequency causing the ink passing through the orifice to be broken into minute droplets equal in number to the crystal vibrations. The droplets are assigned the correct trajectory by the writing head in order to produce characters on paper.

The second mode of operation is known as synchronous ink-jet printing in which ink droplets are produced continuously. This is achieved by pressurizing the ultrasonically attenuated jet to ~3×10$^5$ Pa which produces a stream of droplets (10$^6$ per second) with a velocity of ~20 m sec$^{-1}$. The ink drops used to generate characters are inductively charged and deflected in a high voltage electric field to a specific position on paper. The uncharged ink droplets pass undeflected through the electric field to be caught in a gutter and recirculated through the fluidic circuit.

Inks which are suitable for use in an ink jet printing system should display a consistent drop breakup length, drop velocity and, for synchronous ink jet printing, drop charge under set operating conditions. Conventional ink jet inks are complex multicomponent systems containing dye(s), polymers, solubilizing agents, chelating agents and biocides.

Several drawbacks plague the use of dye-containing, water-based inks. Dyes suffer a limited color selection and gamut when compared to pigments. This results in limited color reproduction. Furthermore, dyes are not as lightfast and waterfast as pigments. Dyes also tend to wick and bleed into uncoated and rough papers. The degree of spreading depends upon the paper used. Thus, the range of papers which can be used with dye-based inks is limited. In addition there is a loss in image resolution due to feathering and intercolor bleeding of image characters on the paper.

Because of the limitations of the water-soluble dye approach, researchers have worked with pigment-based inks. Although pigment-based inks are more lightfast and waterfast and can be used with a wide range of papers, it is still very difficult to obtain particles small enough which do not settle and clog the orifice of the printing system. The orifice must remain open for a wide range of operating conditions, e.g., temperature and humidity.

Conventional processes for preparing pigment-based ink jet inks include blending ink jet materials together and then mixing and grinding with a known dispersing device such as a ball mill, homomixer, sand mill or roll mill. Japanese Patent Application Publication No. 61-57,669 which was laid open on Mar. 24, 1986 and Japanese Application Publication No. 61-168,677 which was laid open on July 30, 1986, describe the preparation of pigment-based inks using these conventional techniques.

U.S. Pat. No. 4,597,794 describes a process wherein the pigmented ink jet ink is prepared by dispersing fine particles of pigments in an aqueous dispersion medium containing polymer having both a hydrophilic and hydrophobic construction portion. The components were prepared using the standard processes described above.

One of the problems with the conventional methods used to prepare pigmented ink jet inks is that they are very time consuming. It is believed that pigment dispersions prepared by standard milling processes, generally, do not possess sufficiently small particle size and are not sufficiently stable. Accordingly, when incorporated into a printing system, the ink particles tend to agglomerate resulting in the clogging of the small nozzles present in the printing heads of the ink jet devices. There is still a need for a process which enables the quick preparation of a pigmented ink jet ink wherein the ink contains a substantially reduced degree of agglomeration so that the ink does not clog the nozzles of the ink jet printing system and the resulting deflocculated ink does not re-agglomerate during storage or jetting.

BRIEF DESCRIPTION OF THE DRAWINGS

FIG. 1 is an electron micrograph of a dry carbon black pigment (Mogul-L ® manufactured by Cabot Corporation, Boston, Mass.) taken at a magnification of about 1.01×10$^3$ which shows substantial agglomeration of dry pigment particles. The resulting agglomerates were well over 1 micron and, in some instances, were over 10 microns in size.

FIG. 2 is an electron micrograph of the deflocculated black ink jet ink of Example 8 taken at a magnification of about 5.20×10$^4$ which shows that defloculation according to the present invention substantially reduces the degree of agglomeration.

FIG. 3 is an electron micrograph of a carbon black pigment (Mogul-L ® manufactured by Cabot Corporation, Boston, Mass.) which was taken at a magnification of about 5.20×10$^4$. It shows the submicron size of the individual pigment particles constituting the agglomerate.

SUMMARY OF THE INVENTION

In accordance with this invention there is provided a process for the preparation of pigmented ink jet inks comprising:

(a) mixing at least one pigment and at least one pigment dispersant in a dispersant medium to form a pigmented ink mixture wherein pigment is present in an amount up to 60% by weight based on the total weight of the mixture; and (b) deflocculating the pigmented ink mixture by passing the pigmented ink mixture through at least a plurality of nozzles within a liquid jet interaction chamber at a liquid pressure of at least 1,000 psi to produce a substantially uniform dispersion of pigment particles in the dispersant medium.

DETAILED DESCRIPTION OF THE INVENTION

An apparatus having a liquid interaction chamber useful in step (b) of the process of the invention is a Microfluidizer ® manufactured by Microfluidics, Newton, Mass. Apparatus of this type are described in U.S. Pat. No. 4,533,254, issued to Cook et al. on Aug. 6, 1985, which is hereby incorporated by reference. Various embodiments of the liquid jet interaction chamber are disclosed therein in columns 3 and 4 and FIGS. 2 to 9, column 6, line 55 to column 8 line 32; FIGS. 10 to 13, column 8, line 33 to column 9, line 42; and FIGS. 14 to 20, column 9, line 43 to column 10, line 43; with further improvements in the embodiment illustrated in FIGS. 14 to 20 being shown in FIGS. 22 to 24, column 10, line 59 to column 11, line 20; incorporated herein by reference. This apparatus has been used in the preparation of fine emulsions, microemulsion, dispersions, etc. by the dynamic interaction of two fluid streams in precisely defined geometry, e.g., microchannels. A fine emulsion having a narrow size distribution is defined as one in which the droplet size of the dispersed phase is substantially below 1 micrometer.

Applicant's assignee's, E. I. du Pont de Nemours and Company's, copending patent application filed on Mar. 27, 1987, Ser. No. 07/030,993, which has been allowed, discloses the use of a liquid jet interaction chamber in the preparation of electrostatic liquid developers wherein solid resin particles are reduced in size. The solid resin particles may contain solid pigment particles dispersed therein.

The inventors are not aware of the use of a liquid jet interaction chamber in the preparation of pigmented ink jet inks wherein a pigmented ink jet mixture is deflocculated.

By deflocculation it is meant that the degree of agglomeration of very small pigment particles is substantially reduced. According to the process of the present invention, the pigmented ink mixture is deflocculated by passing it through at least a plurality of nozzles within a liquid jet interaction chamber at a liquid pressure of at least 1,000 psi. Not only is the degree of agglomeration substantially reduced, a substantially uniform dispersion of pigment particles in the dispersant medium is produced.

To show that the degree of agglomeration of pigment particles is substantially reduced, scanning electron micrographs were taken on a Phillips Model 505 scanning electron microscope (SEM). The voltage was 20 kV. Each micrograph contains a scale at the bottom corresponding to one micron.

FIG. 1 is a scanning electron micrograph of a carbon black pigment (Mogul-L ® manufactured by Cabot Corporation, Boston, Mass.). Magnification was about $1.01 \times 10^3$. According to the scale placed at the bottom of the micrograph, the agglomerated pigment particles were extremely large. For the most part, these agglomerates were well over 1 micron in size.

FIG. 2 is a scanning electron micrograph of a deflocculated black ink jet ink as described in Example 8. The degree of magnification was about $5.20 \times 10^4$. According to the scale at the bottom of the micrograph, the degree of agglomeration was substantially reduced. Any agglomerate which remained was well below one micron in size.

FIG. 3 is a scanning electron micrograph of the same pigment that was used in FIG. 1. The difference between FIG. 1 and FIG. 3 is the degree of magnification. In FIG. 1 the degree of magnification was about $1.01 \times 10^3$ and in FIG. 3 the degree of magnification was about $5.20 \times 10^4$. FIG. 3 shows a closeup of an agglomerate of pigment particles in which individual pigment particles can be seen. A comparison of FIGS. 3 and 2 shows that the ultimate size of the pigment particles before deflocculation (FIG. 3) and after deflocculation (FIG. 2) remained substantially unchanged.

The liquid jet interaction chamber block of the apparatus comprises:

(a) a plurality of submerged nozzles providing elongated orifices arranged to eject under pressure a plurality of thin sheets of the pigmented ink jet mixture, the nozzles being arranged to effect turbulent jet action of the sheets along a common liquid jet interaction front and the sheets being ejected by the nozzles into a low pressure zone filled with the liquid further creating turbulent jet interaction along a common boundary essentially defined and formed by the mixture in the low pressure zone and by the sheets ejected into the low pressure zone;

(b) jet interaction chamber-defining means arranged to provide the low pressure zone of the liquid system in which the turbulent jet interaction is effected;

(c) inlet channel means to deliver the mixture under pressure to the nozzles; and (d) means to withdraw the pigmented ink mixture in the form of a dispersion from the low pressure zone.

The above described apparatus, which is operated at a pressure of at least 1000 psi ($6.89 \times 10^6$ kg/m.sec.$^2$), e.g., 1000 psi ($6.89 \times 10^6$ kg/m.sec.$^2$) to 20,000 psi ($13.78 \times 10^7$ kg/m.sec.$^2$), not only can be used for step (b) of the process, but the mixing step (a) as well.

A wide variety of organic and inorganic pigments can be used to practice the invention. The term pigment as used herein means an insoluble colorant. This invention is not limited to the use of one pigment. A pigment or combination of pigments can be used to practice the invention.

Pigments can be used in dry form as well as in other forms. For example, pigments are usually manufactured in aqueous media and the resulting pigment is obtained as water wet presscake. In presscake form, the pigment is not agglomerated to the extent that it is agglomerated in dry form. Thus, pigment in water wet presscake would not require as much deflocculation as dry pigment.

Examples of pigments include Monastral ® Blue G (C.I. Pigment Blue 15 C.I. No. 74160), Toluidine Red Y (C.I. Pigment Red 3), Quindo ® Magenta (Pigment Red 122), Indo ® Brilliant Scarlet (Pigment Red 123, C.I. No. 71145), Toluidine Red B (C.I. Pigment Red 3), Watchung ® Red B (C.I. Pigment Red 48), Permanent Rubine F6B13-1731 (Pigment Red 184), Hansa ® Yellow (Pigment Yellow 98), Dalamar ® Yellow (Pigment Yellow 74, C.I. No. 11741), Toluidine Yellow G (C.I. Pigment Yellow 1), Monastral ® Blue B (C.I. Pigment Blue 15), Monastral ® Green B (C.I. Pigment Green 7), Pigment Scarlet (C.I. Pigment Red 60), Auric Brown (C.I. Pigment Brown 6), Monastral ® Green G (Pigment Green 7), Carbon Black, Cabot Mogul L (Pigment Black C.I. No. 77266), and Sterling NS N 774 (Pigment Black 7, C.I. No. 77266).

Pigments which can be used in the form of a water wet presscake include: Heucophthal Blue BT-585-P, Monastral® Blue G (C.I. Pigment Blue 15, C.I. No. 74160), Toluidine Red Y (C.I. Pigment Red 3), Quindo® Magenta (Pigment Red 122), Magenta RV-6831 presscake (Mobay Chemical, Harmon Division, Haledon, N.J.), Indo® Brilliant Scarlet (Pigment Red 123, C.I. No. 71145), Toluidine Red B (C.I. Pigment Red 3), Watchung® Red B (C.I. Pigment Red 48), Permanent Rubine F6B13-1731 (Pigment Red 184), Hansa® Yellow (Pigment Yellow 98), Dalamar® Yellow YT-839-P (Pigment Yellow 74, C.I. No. 11741), Toluidine Yellow G (C.I. Pigment Yellow 1), Monastral® Blue B (C.I. Pigment Blue 15), Monastral® Green B (C.I. Pigment Green 7), Pigment Scarlet (C.I. Pigment Red 60), Auric Brown (C.I. Pigment Brown 6), Monastral® Green G (Pigment Green 7), etc. Black pigments, such as carbon black, are not generally available in the form of aqueous presscakes.

Fine particles of metal or metal oxides can be used to practice the invention. Metal and metal oxides are suitable for the preparation of magnetic ink jet inks. Fine particle size oxides, e.g., silica, alumina, titania, etc.; preferably in the order of 0.5 micrometer or less can be used. Furthermore, finely divided metal particles, e.g., copper, iron, steel, aluminum and alloys fall within the scope of this invention.

The amount of pigment or combination of pigments used should permit free flow of the ink mixture through the device. It is believed that this amount could be as high as about 60% pigment. Preferably, the amount of pigment is about 0.1 to about 30% and, most preferably, from about 0.1 to about 10%. Percentages were by weight based on the total weight of the mixture.

At least one pigment dispersant is used to help stabilize the pigment particles. Selection of a suitable dispersant or combination of dispersants will depend upon the pigment, the dispersant medium and how the dispersant or combination affects surface tension and viscosity of the resulting pigment mixture. Another consideration is the method that will be used to make the pigmented ink jet mixture. Although the practice of this invention is not limited to a particular dispersant or combination of dispersants, it has been found that an anionic/nonionic surfactant, such as Daniel's Disperse-Ayd W-22, W-28 and/or a polymeric pigment dispersant, such as, Tamol SN manufactured by Rohm and Haas work well.

Jet velocity, separation length of the droplets, drop size and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 50 dyne/cm. Acceptable viscosities are in the range of about 1.0 cP to about 5.0 cP. It should be noted that the process of the invention can be used to make ink jet inks having a wide range of viscosities and surface tensions.

The term dispersant medium refers to the carrier liquid which can be water or a mixture of water and at least one water-soluble organic solvent. Selection of a suitable mixture rests on a number of factors, such as, surface tension, viscosity, pigment dispersant to be used, drying time of the pigmented ink jet ink, and the type of paper onto which the ink will be printed. Representative examples of water-soluble organic solvents include the following: alcohols such as methyl alcohol, ethyl alcohol, n-propyl alcohol, iso-propyl alcohol, n-butyl alcohol, sec-butyl alcohol, tert-butyl alcohol, iso-butyl alcohol, furfuryl alcohol, tetrahydrofurfuryl alcohol, etc.; ketones or alcohols such as acetone, methyl ethyl ketone, diacetone alcohol, etc.; alkanolamines such as monoethanolamine, diethanolamine, triethanolamine, etc.; amides such as dimethylformamide, dimethylacetoamide, etc.; ethers such as tetrahydrofuran, dioxane, etc.; esters such as ethyl acetate, ethyl lactate, ethylene carbonate, propylene carbonate, etc.; polyhydric alcohols such as ethylene glycol, diethylene glycol, triethylene glycol, propylene glycol, tetraethylene glycol, polyethylene glycol, glycerol, 1,2,6-hexanetriol, thiodiglycol etc.; lower alkyl mono- or di-ethers derived from alkylene glycols such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether, diethylene glycol di-methyl (or -ethyl) ether, etc.; nitrogen containing cyclic compounds such as pyrrolidone, N-methyl-2-pyrrolidone, 1,3-dimethyl-2-imidazolidinone, etc.

A mixture of water and a polyhydric alchohol, such as, ethylene glycol is preferred for the dispersant medium. In the case of a mixture of water and ethylene glycol, the dispersant medium usually contains anywhere from about 30% water and 70% ethylene glycol to about 90% water and about 10% ethylene glycol. The preferred ratios are anywhere from 60% water and 40% ethylene glycol to about 80% water and 20% ethylene glycol. Percentages are by weight based on the total weight of the dispersant medium.

Step (a) of the invention can be performed by any means known to those skilled in the art. It is not limited to the use of the apparatus having a liquid jet interaction chamber but other devices for mixing can be used, e.g., by stirring, mixing by sonication, mixing by hand, in a mixing, grinding or blending vessel such as a vessel equipped with a stirrer; attritor, ball mill, vibratory mill such as a Sweco Mill manufactured by Charles Ross and son, Hauppauge, N.Y., equipped with a stirrer, etc.

Subsequently, the resulting mixture is deflocculated. For example, in one embodiment of the process the mixing of step (a) and the deflocculation is accomplished in an apparatus having at least one liquid jet interaction chamber of the type described above. In a second embodiment of the process, the mixing step (a) is accomplished in an attritor and step (c), as require, is accomplished in the apparatus having at least one liquid jet interaction chamber. It has been found that defloccuation of the pigmented ink jet mixture can be accomplished in a relatively short period of time, much quicker than in known processes for making pigmented ink jet inks. Known apparatus having at least one liquid jet interaction chamber, e.g., preferably two in series, have a capacity up to 50 gallons (190 liters)/minute. The average time to make pigmented ink jet inks varies depending on the amount of ink produced and the size of the apparatus available which produce per pass through the apparatus at the rate of 0.1 gallon (0.38 liter)/minute up to 50 gallons (190 liters)/minute and ranges in between. Of course, longer defloccuation periods by repeated passes through the apparatus can be used but generally are not necessary.

Table I, set forth at the end of the Examples, shows how quickly pigmented ink jet inks can be prepared using the process of the invention compared to preparing ink jet inks using an attritor.

After deflocculation, the resulting ink contains a substantially uniform dispersion of pigment particles in the dispersant medium. As is shown in the examples, prints produced from printing systems containing pigmented ink jet inks produced in accordance with the invention had excellent quality with little feathering and bleeding.

Various instruments are known to measure the particle size. One such instrument is the Brookhaven Particle Sizer Model Bl-80. This apparatus uses auto correlation analysis of 90° laser light scattering. In this analysis the scattering fluctuation is detected and mathematically analyzed correlating the scattering between particles vs. time and fitting same to an exponential decay. The decay rate is a function of the particle size. This apparatus can measure particle diameters in the range of 50å to 5μ. The equipment supplier is Brookhaven Instrument Corporation, 200 Thirteenth Ave., Ronkonkoma, N.Y. 11779.

Measurement procedure is to place a diluted sample of particles to be measured in the plastic sample holder which is then placed in the apparatus. In the instant invention, the particles were suspended in a water ethylene glycol mixture (60/40), and sonicated for 30 seconds. The sample dilution was such that holding same to the light a milky transparent characteristic was observed. The parameters used in the measurement were temp 25° C., dust cut off 20, viscosity 1.37 cP, refractive index 1.33, measurement 2000 cycles. The analysis gave the median particle size and the polydispersity (width of distribution).

Another instrument for measuring average particle sizes is a Malvern 3600E Particle Sizer manufactured by Malvern, Southborough, Mass. which uses laser diffraction light scattering of stirred samples to determine average particle sizes. Since these instruments use different techniques to measure average particle size, the readings differ. This apparatus can measure particle diameters in the range of about 0.5 to about 560 microns.

It is desirable to make the pigmented ink jet ink in a concentrated form which can then be diluted to the appropriate concentration for use in the ink jet printing system. This permits one to make a greater quantity of pigmented ink mixture.

Before the pigmented ink jet mixture can be used in an ink jet printing system, the ink can be diluted in order to control color, hue, saturation, density and print area coverage of the pigmented ink jet ink when it is used in an ink jet printing system. Any liquid or combination of liquids can be used as diluent as long as the liquid or combination are compatible with the dispersant medium. Preferably, additional dispersant medium is used as diluent. It is not important when the concentrated pigmented ink jet mixture is diluted. This can be done either before or after the deflocculation of step (b). The final concentration of pigment particles in the ink jet ink to be used in the ink jet printing system should be between about 5% to about 10%, and, more preferably, between 0.1 and 5.0%. Percentages are by weight based on the total weight of the mixture.

It is also within the scope of this invention to formulate a pigmented ink jet ink containing additives, such as, biocides, humectants, chelating agents, and/or viscosity modifiers which are known to those skilled in the art. The choice of additive or combination of additives will be governed by the surface behavior of the additive or additives selected.

EXAMPLES

The following examples wherein the parts and percentages are by weight illustrate but do not limit the invention.

The apparatus having a liquid jet interaction chamber used in the examples below is a Microfluidizer ® Model M-110 (Microfluidics, Newton, Mass.) equipped with a standard interaction chamber and back pressure module (H10-H30) and a backflush system. The Microfluidizer ® had a flow rate of about 0.1 gallon (0.38 liter)/minute. The average particle sizes were determined by a Malvern 3600 Particle Sizer (Malvern, Southborough, Mass.) or a Brookhaven Particle Sizer Model B1-90. In some cases a Horiba CAPA500 centrifugal particle analyzer (by area) was used.

CONTROL EXAMPLE 1

In a Union Process IS Attritor, Union Process Company, Akron, Ohio, were placed the following ingredients:

| Ingredient | Amount (g) |
| --- | --- |
| Heucophthal Blue G XBT-583D (Heubach, Inc. Newark, NJ) | 500.0 |
| Daniels W-22 (Daniels Prod. Co., Jersey City, NJ) | 125.0 |
| Distilled Water | 625.0 |
| Ethylene Glycol (J. T. Baker Chem. Co., Phillipsbury, NJ) | 416.7 |

The ingredients were milled at a rotor speed of 230 rpm with 0.1875 inch (4.76 mm) diameter stainless steel balls for 15.5 hours. The particulate media were removed and the ink was diluted to 20% solids with 500 grams of distilled water and 333.3 grams of ethylene glycol. After attriting, the viscosity of the ink was noticeably higher than that of inks prepared with the Microfluidizer ®. The ink was filtered through a #120 mesh screen. Particle size was measured with the Malvern 3600E Particle Sizer was 0.6 microns. Particle size measured with the Brookhaven was 0.18 microns. Surface tension was 48.2 dyne/cm and the viscosity was 37.6 cP. Because the viscosity was outside the acceptable range for ink jet printing, the ink was not tested.

CONTROL EXAMPLE 2

In a Union Process IS Attritor, Union Process Company, Akron, Ohio, were placed the following ingredients:

| Ingredient | Amount (g) |
| --- | --- |
| Magenta Pigment R6700 (Mobay Chem. Corp., Haledon, NJ) | 250.0 |
| Magenta Pigment R6713 (Mobay Chem. Corp., Haledon, NJ) | 250.0 |
| Daniels W-22 (Daniels Prod. Co., Jersey City, NJ) | 125.0 |
| Distilled Water | 625.0 |
| Ethylene Glycol (J. T. Baker Chem. Co., Phillipsbury, NJ) | 416.7 |

The ink was prepared as in Control Example 1 except for the following exceptions: The ingredients were milled for 18.5 hours. The ink was too viscous for efficient milling so the ink was diluted to 20% solids with 500 grams of distilled water and 333.3 grams of ethylene glycol and milling was continued. After 23 hours of total milling, the ink was still too viscous, and 125 more grams of Daniels W-22 were added and ink was further diluted with 384 grams of distilled water and 260 grams of ethylene glycol. After 42 hours of total milling, the ink was separated from the particulate media. Particle size measured with the Malvern 3600E Particle Sizer was 1.8 microns. Because the viscosity was outside the acceptable range for ink jet printing, the ink was not tested.

CONTROL EXAMPLE 3

In a Union Process 1S Attritor (Union Process Company, Akron, Ohio), were placed the following ingredients:

| Ingredient | Amount (g) |
| --- | --- |
| Mogul L Carbon Black (Cabot Corp., Boston, MA) | 12.5 |
| Triton X-100 (Rohm & Haas, Philadelphia, PA) | 1.0 |
| Distilled Water | 142.5 |
| Diethylene Glycol (J. T. Baker Chem. Co., Phillipsbury, NJ) | 95.0 |

The ingredients were milled at a rotor speed of 230 rpm with 0.1875 inch (4.76 mm) diameter stainless steel balls for 2 hours. The particulate media were removed by filtering through a #120 mesh screen. Particle size measured with the Malvern 3600E Particle Sizer was 1.5 microns. This ink was loaded into an empty ink jet thimble and placed in a Hewlett Packard ThinkJet Printer. The printer was run continuously for 1 hour giving crisp images with very little ink bleed on both coated ThinkJet paper and standard office bond paper. Although in this test no jet orifices became plugged, some settling was apparent after the ink was allowed to stand for 24 hours.

EXAMPLE 1

The following ingredients were mixed by stirring:

| Ingredient | Amount (g) |
| --- | --- |
| Dalamar Yellow YT-858D (Heubach Inc., Newark, NJ) | 26.88 |
| Daniels Disperse-Ayd W-22 (Daniels Prod. Co., Jersey City, NJ) | 6.72 |
| Distilled Water | 300.00 |
| Ethylene Glycol (J. T. Baker Chem. Co., Phillipsbury, NJ) | 200.00 |

The resultant ink contained 5% pigment. The ink was passed through a Microfluidizer ® Model 110 (Microfluidics Corp., Newton, Mass.) four times operating at 8,000 psi to deflocculate the pigment particles. The final average particle size was 1.0 micron as measured with a Malvern 3600E Particle Sizer (Malvern Instruments, Southborough, Mass.) and 0.21 microns as measured with a Brookhaven Model Particle Sizer. The surface tension of the resultant ink was 36.7 dyne/cm measured with a Fischer Surface Tensiomate Model 21 with a 6 cm tension ring. The viscosity of the ink was 3.5 cP measured with a Bohlin Viscometer with spindle speeds of 60 rpm. The ink was printed without further dilution on rough and smooth papers (HP Thinkjet printer paper and Plainwell offset enamel paper number 3, 60 pound test) with a Hewlett Packard Thinkjet Printer with excellent print quality and little nozzle clogging. The printed characters showed excellent dot quality with little feathering and bleeding. This example showed excellent image quality for a yellow ink with a bubble jet print head and pigment dispersant that lowered the surface tension.

EXAMPLE 2

The following ingredients were mixed by stirring:

| Ingredient | Amount (g) |
| --- | --- |
| Magenta Pigment RV-6700 (Mobay Chem. Corp., Haledon, NJ) | 13.44 |
| Magenta Pigment R-6713 (Mobay Chem. Corp., Haledon, NJ) | 13.44 |
| Daniels Disperse-Ayd W-22 (Daniels Prod. Co., Jersey City, NJ) | 6.72 |
| Distilled Water | 300.00 |
| Ethylene Glycol (J. T. Baker Chem. Co., Phillipsbury, NJ) | 200.00 |

The ink mixture was prepared as in Example 1 except for the above pigment changes and the changes noted below. The resultant ink mixture containing 5% pigment was recirculated for 20 minutes through a Microfluidizer ® Model 110 (Microfluidics Corp., Newton, Mass.) operating at 8,000 psi to deflocculate the pigment particles. The final average particle size was 1.3 micron as measured with a Malvern 3600E Particle Sizer. The average particle size measured with a Brookhaven Model Particle Sizer was 0.13 microns. The surface tension of the resultant ink mixture was 42.2 dyne/cm and the viscosity of the ink was 3.8 cP. The ink was printed without further dilution on rough and smooth papers (HP Thinkjet printer paper and Plainwell offset enamel paper number 3, 60 pound test) with a Hewlett Packard Thinkjet Printer with excellent print quality and little nozzle clogging. The printed characters showed excellent dot quality with little feathering and bleeding. This example showed excellent image quality for a magenta ink with a bubble jet print head and pigment dispersant that lowered the surface tension. It also showed the blending of two pigments for color correction.

EXAMPLE 3

The following ingredients were mixed by stirring:

| Ingredient | Amount (g) |
| --- | --- |
| Heucophthal Blue G XBT-583D (Heubach Inc., Newark, NJ) | 26.88 |
| Daniels Disperse-Ayd W-22 (Daniels Prod. Co., Jersey City, NJ) | 6.72 |
| Distilled Water | 300.00 |
| Ethylene Glycol (J. T. Baker Chem. Co., Phillipsbury, NJ) | 200.00 |

This ink was prepared as in Example 1 except for the above pigment changes and the changes noted below. The resultant ink containing 5% pigment was recirculated for 10 minutes through a Microfluidizer ® Model 110 (Microfluidics Corp., Newton, Mass.) operating at 8,000 psi to deflocculate the pigment particles. Before deflocculation, the average particle size was 11.7 microns as measured with the Malvern. The average particle size after deflocculation was 0.6 micron as measured with a Malvern 3600E Particle Sizer and 0.10 microns measured by the Brookhaven Model Particle Sizer. The surface tension of the resultant ink was 43.8 dyne/cm and the viscosity of the ink was 3.6 cP. The ink was printed without further dilution on rough and smooth papers (HP Thinkjet printer paper and Plainwell offset enamel paper number 3, 60 pound test) with a Hewlett Packard Thinkjet Printer with excellent print quality and little nozzle clogging. The printed characters showed excellent dot quality with little feathering and bleeding. This example showed excellent image quality for a cyan ink with a bubble jet print head and pigment dispersant that lowered the surface tension.

EXAMPLE 4

The following ingredients were mixed by stirring:

| Ingredient | Amount (g) |
| --- | --- |
| Sterling NS Carbon Black (Cabot Corp., Boston, MA) | 26.88 |
| Daniels Disperse-Ayd W-22 (Daniels Prod. Co., Jersey City, NJ) | 4.00 |
| Distilled Water | 300.00 |
| Ethylene Glycol (J. T. Baker Chem. Co., Phillipsbury, NJ) | 200.00 |

This ink was prepared as in Example 1 except for the above pigment changes and the changes noted below. The resultant ink mixture containing 5% pigment was passed through a Microfluidizer ® Model 110 (Microfluidics Corp., Newton, Mass.) four times operating at 8,000 psi to deflocculate the pigment particles. Before deflocculation, the average particle size was 73 microns as measured by the Malvern. The average particle size after deflocculation was 0.6 micron as measured with a Malvern 3600E Particle Sizer and 0.20 microns as measured by the Brookhaven. The surface tension of the resultant ink was 41.4 dyne/cm and the viscosity of the ink was 3.3 cP. The ink was printed without further dilution on rough and smooth papers (HP ThinkJet printer paper and Plainwell offset enamel paper number 3, 60 pound test) with a Hewlett Packard ThinkJet Printer with excellent print quality and little nozzle clogging. The printed characters showed excellent dot quality with little feathering and bleeding. This example showed excellent image quality for a black ink with a bubble jet print head and pigment dispersant that lowered the surface tension.

EXAMPLE 5

The following ingredients were mixed by stirring:

| Ingredient | Amount (g) |
| --- | --- |
| Dalamar Yellow YT-858D (Heubach Inc., Newark, NJ) | 150 |
| Tamol SN (Rohm & Haas, Philadelphia, PA) | 30 |
| Distilled Water | 1056 |
| Ethylene Glycol (J. T. Baker Chem. Co., Phillipsbury, NJ) | 264 |

This ink was prepared as in Example 1 except for the above ingredient changes and the changes noted below. The resultant ink mixture containing 10% pigment was passed through a Microfluidizer ® Model 110 (Microfluidics Corp., Newton, Mass.) four times operating at 8,000 psi to deflocculate the pigment particles. The ink was then filtered through a 5 micron filter. The average particle size after deflocculation was 0.8 microns as measured with a Malvern 3600E Particle Sizer. The surface tension of the resultant ink mixture was 68 dyne/cm and the viscosity of the ink mixture was 1.9 cP. The ink was diluted to 5.0% pigment and 2.5% pigment with 40% ethylene glycol in water and printed at 10%, 5% and 2.5% pigment on rough and coated papers (Savin 2200 office copier paper and Xerox 4020 printer paper) with a Xerox 4020 four color printer with little nozzle clogging. The density of printed yellow solids was excellent for all three concentrations. The printed image quality was excellent on the coated paper but showed uneven solids and beading on uncoated paper due to the extremely high surface tension. The prints showed excellent dot quality and reduced feathering and bleeding intercolor bleeding compared to the standard dye-based colored inks. This example showed excellent image quality for a yellow ink with a piezo jet print head, four color imaging, and a pigment dispersant that did not affect the surface tension.

EXAMPLE 6

The following ingredients were mixed by stirring:

| Ingredient | Amount (g) |
| --- | --- |
| Magenta pigment RV-6700 (Mobay Chem. Corp., Haledon, NJ) | 75 |
| Magenta pigment R-6713 (Mobay Chem. Corp., Haledon, NJ) | 75 |
| Tamol SN (Rohm & Haas, Philadelphia, PA) | 30 |
| Distilled Water | 1056 |
| Ethylene Glycol (J. T. Baker Chem. Co., Phillipsbury, NJ) | 264 |

This ink was prepared as in Example 1 except for the above ingredient changes and the changes noted below. The resultant ink mixture containing 10% pigment was passed through a Microfluidizer ® Model 110 (Microfluidics Corp., Newton, Mass.) five times operating at 8,000 psi to deflocculate the pigment particles. The ink was then filtered through a 5 micron filter. The average particle size after deflocculation was 1.2 micron as measured with a Malvern 3600E Particle Sizer. The surface tension of the resultant ink was 68 dyne/cm and the viscosity of the ink was 1.9 cP. The ink was diluted to 5% and 2.5% pigment with 40% ethylene glycol in water and printed at 10%, 5%, and 2.5% on rough and coated papers (Savin 2200 office copier paper and Xerox 4020 printer paper) with a Xerox 4020 four color printer with little nozzle clogging. The magenta printed solids showed excellent density at all three concentrations but were oversaturated, i.e., became muddy red at 5% and 10%. The printed image quality was excellent on the coated paper but showed uneven solids and beading on uncoated paper due to the extremely high surface tension. The prints showed excellent dot quality and reduced feathering and intercolor bleeding compared to the standard dye-based colored inks. This example showed excellent image quality for a magenta ink with a piezo jet print head, four color imaging, and a pigment dispersant that did not affect the surface tension.

EXAMPLE 7

The following ingredients were mixed by stirring:

| Ingredient | Amount (g) |
| --- | --- |
| Heucophthal Blue G XBT-583D (Heubach Inc., Newark, NJ) | 80.0 |
| Tamol SN (Rohm & Haas, Philadelphia, PA) | 16.0 |
| Distilled Water | 563.2 |

-continued

| Ingredient | Amount (g) |
|---|---|
| Ethylene Glycol (J. T. Baker Chem. Co., Phillipsbury, NJ) | 140.8 |

This ink was prepared as in Example 1 except for the above ingredient changes and the changes noted below. The resultant ink mixture containing 10% pigment was passed through a Microfluidizer ® Model 110 (Microfluidics Corp., Newton, Mass.) four times operating at 8,000 psi to defloculate pigment particles. The ink was then filtered through a 5 micron filter. The average particle size after deflocculation was 0.6 micron as measured with a Malvern 3600E Particle Sizer. The surface tension of the resultant ink was 68 dyne/cm and the viscosity of the ink was 1.9 cP. The ink was diluted to 5% and 2.5% pigment with 40% ethylene glycol in water and printed at 10%, 5%, and 2.5% pigment on rough and coated papers (Savin 2200 office copier paper and Xerox 4020 printer paper) with a Xerox 4020 four color printer with little nozzle clogging. Printed agar solid areas showed excellent density at all three concentrations but was oversaturated for the 10% ink. The printed image quality was excellent on the coated paper but showed uneven solids and beading on uncoated paper due to the extremely high surface tension. The prints showed excellent dot quality and reduced feathering and intercolor bleeding compared to the standard dye-based colored inks. This example showed excellent image quality for a cyan ink with a piezo jet print head, four color imaging, and a pigment dispersant that did not affect the surface tension.

EXAMPLE 8

The following ingredients were mixed by stirring:

| Ingredient | Amount (g) |
|---|---|
| Mogul L Carbon Black (Cabot Corp., Boston, MA) | 150 |
| Tamol SN (Rohm & Haas, Philadelphia, PA) | 30 |
| Distilled Water | 1056 |
| Ethylene Glycol (J. T. Baker Chem. Co., Phillipsbury, NJ) | 264 |

This ink was prepared as in Example 1 except for the above ingredient changes and the changes noted below. The resultant ink mixture containing 10% pigment was passed through a Microfluidizer ® Model 110 (Microfluidics Corp., Newton, Mass.) four times operating at 8,000 psi to defloculate the pigment particles. The ink was then filtered through a 5 micron filter. The average particle size after deflocculation was 0.6 micron as measured with a Malvern 3600E Particle Sizer. The surface tension of the resultant ink was 68 dyne/cm and the viscosity of the ink was 1.9 cP. The ink was diluted to 5% and 2.5% pigment with 40% ethylene glycol in water and printed at 10%, 5%, and 2.5% pigment on rough and coated papers (Savin 2200 office copier paper and Xerox 4020 printer paper) with a Xerox 4020 four color printer with little nozzle clogging. Printed black solid areas showed good density at all three concentrations. The printed image quality was excellent on the coated paper but showed uneven solids and beading on uncoated paper due to the extremely high surface tension. The prints showed excellent dot quality and reduced feathering and intercolor bleeding compared to the standard dye-based colored inks. This example showed excellent image quality for a black ink with a piezo jet print head, four color imaging, and a pigment dispersant that did not affect the surface tension.

TABLE I

| Example | Method: Deflocculation Using: Attritor | Microfluidizer ® | Preparation Time (min) Deflocculation | Total |
|---|---|---|---|---|
| Control 1 | Yes | | 930 | 955 |
| Control 2 | Yes | | 2520 | 2555 |
| Control 3 | Yes | | 120 | ≈135 |
| Example 1 | | Yes | 6 | 18 |
| Example 2 | | Yes | 20 | 35 |
| Example 3 | | Yes | 10 | 22 |
| Example 4 | | Yes | 6 | 18 |
| Example 5 | | Yes | 16 | 43 |
| Example 6 | | Yes | 21 | 51 |
| Example 7 | | Yes | 9 | 32 |
| Example 8 | | Yes | 16 | 42 |

What is claimed is:

1. A process for the preparation of pigmented ink jet inks comprising:
   (a) mixing at least one pigment and at least one water soluble pigment dispersant in a carrier liquid selected from the group consisting of water or a mixture of water and at least one water-soluble organic solvent to form a pigmented ink mixture wherein pigment is present in an amount from about 0.1% to about 30% by weight based on the total weight of the mixture; and
   (b) deflocculating the pigmented ink mixture by passing the pigmented ink mixture through at least a plurality of nozzles within a liquid jet interaction chamber at a liquid pressure of at least 1,000 psi to produce a substantially uniform dispersion of pigment in the carrier liquid.

2. A process according to claim 1 wherein the pigmented ink is diluted with at least one liquid which is compatible with the carrier liquid to form an ink containing pigment in the range of 0.1% to 10% by weight based on the total weight of the mixture when the mixture of step (a) has pigment present in an amount exceeding 10%, said dilution being made either before or after the deflocculation of step (b).

3. A process according to claim 1 wherein the dispersant is selected from the group consisting of surfactants and polymeric pigment dispersants.

4. A process according to claim 1 wherein the the liquid jet interaction chamber comprises, in combination,
   (a) a plurality of submerged nozzles providing elongated orifices arranged to eject under pressure a plurality of thin sheets of the pigmented ink jet mixture, the nozzles being arranged to effect turbulent jet action of the sheets along a common liquid jet interaction front and the sheets being ejected by the nozzles into a low pressure zone filled with the liquid futher creating turbulent jet interaction along a common boundary essentially defined and formed by the mixture in the low pressure zone and by the sheets ejected into the low pressure zone;
   (b) jet interaction chamber-defining means arranged to provide the low pressure to the nozzles; and
   (c) inlet channel means to deliver the mixture under pressure to the nozzles; and (d) means to withdraw the pigmented ink mixture in the form of a dispersion from the low pressure zone.

5. A process according to claim 2 wherein the pigmented ink is diluted with the dispersant medium.

6. A process according to claim 1 wherein the mixing in step (a) is conducted in liquid jet interaction chamber at a liquid pressure of at least 1000 psi.

7. A process according to claim 6 wherein the liquid jet interaction chamber comprises, in combination, (a) a plurality of submerged nozzles providing elongated orifices arranged to eject under pressure a plurality of thin sheets of the pigmented ink jet mixture, the nozzles being arranged to effect turbulent jet action of the sheets along a common liquid jet interaction front and the sheets being ejected by the nozzles into a low pressure zone filled with the liquid futher creating turbulent jet interaction along a common boundary essentially defined and formed by the mixture in the low pressure zone and by the sheets ejected into the low pressure zone;

(b) jet interaction chamber-defining means arranged to provide the low pressure to the nozzles; and (c) inlet channel means to deliver the mixture under pressure to the nozzles; and (d) means to withdraw the pigmented ink mixture in the form of a dispersion from the low pressure zone.

8. A process according to claim 1 wherein the surface tension of the ink is in the range of about 20 dyne/cm to about 70 dyne/cm.

9. A process according to claim 1 wherein the viscosity of the ink is in the range of about 1.0 cP to about 5.0 cP.

10. A process according to claim 1 wherein the ink mixture contains at least one additive selected from the group consisting of biocides, humectants, chelating agents, and viscosity modifiers.

* * * * *